May 19, 1953     F. A. STRAWSINE     2,638,835
ROOF VENTILATOR

Filed May 17, 1951

INVENTOR.
FERN A. STRAWSINE
BY

Patented May 19, 1953

2,638,835

UNITED STATES PATENT OFFICE 2,638,835

ROOF VENTILATOR

Fern A. Strawsine, Corunna, Mich.

Application May 17, 1951, Serial No. 226,859

1 Claim. (Cl. 98—43)

This invention relates in general to a weather proof ventilator mountable upon a substantially horizontal roof having a circular opening therethrough and an air space between the upper and lower surfaces thereof, and particularly to a type of ventilator having means for exhausting the space below said lower surface as well as the said air space.

Owners and manufacturers of compact, movable living quarters, such as coach type trailers, have long recognized the need for, and present lack of, a completely satisfactory ventilator for such trailers. The ventilation of said trailers involves several unique considerations, some of which are: (1) the ventilator must be light in weight, (2) it must have a pleasing external appearance, (3) it must be externally streamlined, (4) it must be weather proof and (5) it is preferably designed for installation in the roof of the coach to conserve wall space.

Due to the limited space in the average coach trailer and its normal continuous exposure to the direct radiation of the sun, said trailer must be continually ventilated, particularly during warm weather, and yet the ventilator must be so constructed as to protect the interior of the trailer against the entry of rain or snow.

In present roof ventilators for a coach trailer, and similar applications, an external hatch must be opened and left open when the ventilator is in operation, thereby exposing the interior of the coach to damage from rain and the like while the coach is either standing or moving. Further, present ventilators do not exhaust the hot air which accumulates in the air space which is sometimes provided between the upper and lower surfaces of the roof, as well as its walls.

Accordingly, a primary object of this invention is the provision of a ventilator for installation in the roof of a compact living space, including both the type thereof wherein the air space within the roof between the inner and outer, or upper and lower, surfaces thereof is left empty and the type thereof where such space is filled with insulation, such as of the glass fiber or rock wool type.

A further object of this invention is the provision of a ventilator, as aforesaid, having means for exhausting air both from said living space and said air space.

A further object of this invention is the provision of a ventilator, as aforesaid, which can be operated during inclement weather without exposing the interior of the trailer coach to damage from said weather, regardless of whether the coach is moving or standing.

A further object of this invention is the provision of a ventilator, as aforesaid, which requires no more space within the coach than is required by present ventilators, and which has a streamlined and pleasant external appearance.

Other objects of this invention will become apparent to persons familiar with this type of equipment upon referring to the accompanying drawing and upon reading the following specification.

General description

In meeting those objects heretofore mentioned, as well as others incidental thereto and associated therewith, I have provided a ventilator comprising an outer cylinder having means for mounting same upon the upper surface of a substantially horizontal roof, an inner cylinder snugly but slidably receivable coaxially into said outer cylinder, an air handling device supported within said inner cylinder and a weather cap supported upon said mounting means and having an internal splash collar for shielding the external or upper end of the outer cylinder from the weather.

Detailed description

Figure 1:
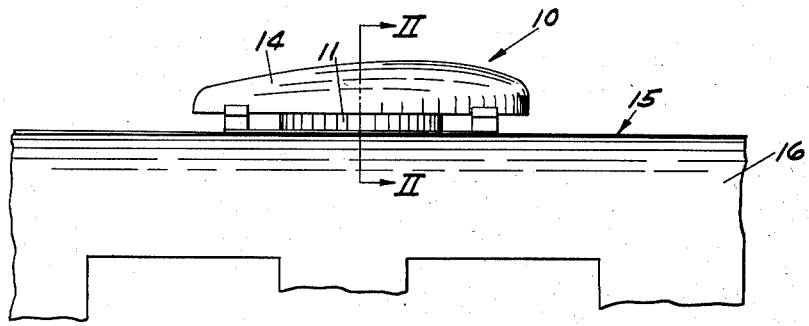
Figure 1 is a broken, side elevation view of a coach type trailer with my improved ventilator mounted thereon.
Figure 2:
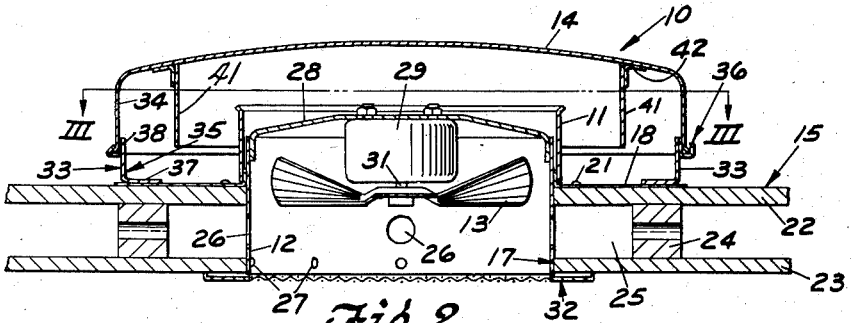
Figure 2 is a sectional view substantially as taken along the line II—II of Figure 1.
Figure 3:
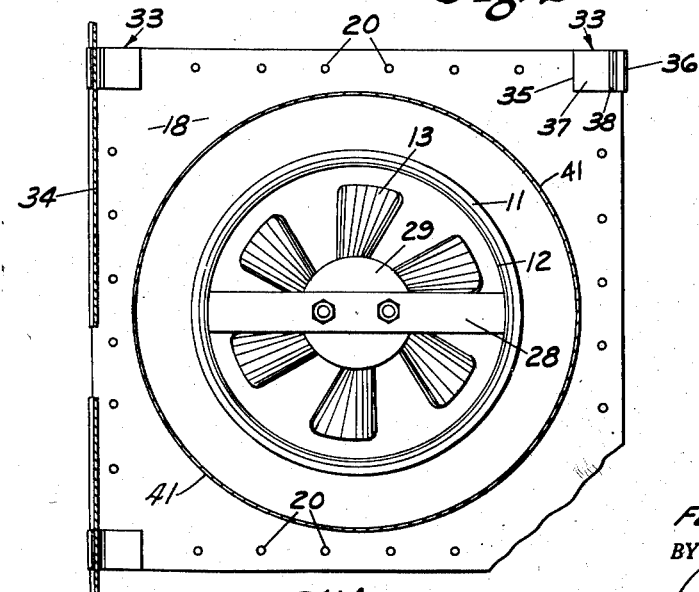
Figure 3 is a sectional view substantially as taken along the line III—III of Figure 2.

As shown in Figures 2 and 3, my improved ventilator 10 is comprised of an outer cylinder 11 of relatively short axial length, an inner cylinder 12 supporting an axial flow fan 13, and a streamlined weather cap or dome 14, all of which are either directly or indirectly supported upon the substantially horizontal roof 15 of a conventional coach type trailer 16 (Figure 1), said roof having a cylindrical opening 17 therethrough.

The outer cylinder 11 is provided with a radially, outwardly extending mounting flange 18 which, in this embodiment, is substantially rectangular and is secured, as by welding, to the lower edge of said outer cylinder. The flange 18 is provided with a plurality of screw openings 20 near the edges thereof whereby said flange may be secured with screws 21 (Figure 2) to the upper and outer panel 22 of the roof 15 in a conventional manner. The roof 15, being of a conventional type, has a lower panel 23 separated from, and secured to, the upper panel 22 in a conventional manner by means of the spacing elements 24, thereby providing an air space 25 in the roof 15 between said upper and lower panels.

The cylindrical opening 17 in the roof 15 is preferably substantially equal in diameter to the inside diameter of the outer cylinder 11 and extends through both said upper and lower panels. The inner cylinder 12, which in a preferred embodiment of the invention is somewhat longer axially than said outer cylinder 11, is snugly but slidably receivable within both said cylindrical opening 17 and said outer cylinder 11. Accordingly, in the event that the inner cylinder 12 is axially slightly longer than the thickness of the roof 15, in a particular application, said inner cylinder 12 may be telescopically received upwardly into the outer cylinder 11.

The inner cylinder 12 is provided with one or more vent openings 26 through the sidewalls thereof, said openings being arranged to communicate with the air space 25 in the roof 15. The inner cylinder 12 is secured to the sidewalls of the cylindrical opening 17 in the roof 15 by any convenient, conventional means, such as the screws 27.

A mounting bar 28, which is diametrically disposed with respect to the cylinder 12, is secured at its ends, as by welding, to the upper edge of the inner cylinder 12. An electric motor 29, or similar means, may be secured to and suspended from the mounting bar 28 midway between the ends thereof, and an axial flow fan 13 is mounted upon the shaft 31 of the motor 29, said shaft being coaxial with the inner cylinder 12.

A protective device or insect barrier 32, such as a grill, damper or shutter, may be mounted on the lower surface of the lower panel 23 over the lower end of the inner cylinder 12, as may be desired or required.

A plurality, here four, of mounting brackets having L-shaped body portions 35 are secured at appropriate points upon the upper surface of the mounting flange 18 preferably adjacent to the edges thereof, as by welding a leg 37 of said body portion 35 thereto. The other leg 38 of each bracket extends upwardly from said flange 18 a distance substantially less than the upward extent of the outer cylinder 11. A channel member 36 is secured, as by welding one leg thereof, to each vertical leg 38 near the upper end thereof so that said channel opens upwardly.

The dome 14 (Figures 1 and 2), which is substantially wider and longer than the diameter of the outer cylinder 11, is provided with an integral, downwardly extending, peripheral flange 34, the lower edge of which is receivable into said channel members 36. The free leg of each channel is then bent toward the bracket leg 38, thereby gripping the edge of the peripheral flange 34. Although the brackets 33 provide a simple, effective means for securing the dome 14 with respect to the mounting flange 18, it will be understood that other similar devices may be used without departing from the scope of this invention.

When the peripheral flange 34 is engaged by said channel members 36, it overlaps the upwardly extending outer cylinder 11, thereby impeding the entrance of rain, snow and other similar undesirable elements into the upper, open end of the outer cylinder 11. However, it has been found that the peripheral flange 34 alone does not positively prevent such entrance of elements under certain conditions. For example, rain striking the roof 15 at an angle adjacent to the flange 34 will splash under the flange 34 into the outer cylinder 11.

Accordingly, a cylindrical splash baffle or collar 41 (Figures 2 and 3) having an internal diameter substantially larger than the external diameter of the outer cylinder 11, is supported upon and within the dome 14 by means of the brackets 42. The collar 41, which is co-axial with, and overlaps, the outer cylinder 11, extends downwardly from the dome 14 to a point spaced slightly upwardly from the lower edge of the flange 34 and intermediate the outer cylinder 11 and said flange 34.

The ventilator 10 is designed so that the minimum area between the lower edge of the peripheral flange 34 and the roof 15, the minimum area between the lower edge of the splash collar 41 and the roof 15, the minimum area between the splash collar 41 and the outer cylinder 11, the minimum area between the upper edge of the outer cylinder 11 and the dome 14, the minimum area between the motor 29 and the inner cylinder 12 and the maximum open area through the protective device 32 are all substantially equal. Thus, back pressure, resulting from restricted openings between the fan 13 and atmosphere, will not be developed.

Further, the above mentioned areas are precisely designed with regard to the C. F. M. of the fan 13 so as to assure free flow of the air exhausted thereby. Although the collar 41 must be spaced a minimum distance from the outer cylinder 11, as mentioned above, it must also be disposed so that it will interrupt any angle of reflection passing above the outer cylinder 11 from a point on the roof 15 accessible by a similar angle of incidence passing under the flange 34.

Operation

After the ventilator 10 is assembled upon the roof 15, substantially as described hereinabove, it is ready for operation. When the axial flow fan 13 is rotated by the motor 29, air is drawn inwardly through the inner cylinder 12 past the vent openings 26 in the sidewall thereof, and exhausted upwardly through the outer cylinder 11, over the upper edges thereof, beneath the collar 41 and expelled to atmosphere between the peripheral flange 34 and the mounting flange 18.

As the air passes the vent openings 26, the velocity thereof aspirates the air from the air space 25, through the vent openings 26 into the cylinder 12, whereupon it is exhausted to atmosphere as described above. Thus, any accumulation of hot air in the air space 25 is removed therefrom, and air displaced from the air space 25, as well as from the coach 16, will be replaced by cooler and fresher air from the atmosphere, in a conventional manner.

Due to the telescopic overlap of the collar 41 and the peripheral flange 34 of the dome 14 with the outer cylinder 11, and the particular arrangement of the collar 41, rain, snow and other types of undesirable elements are prevented from entering the coach 16 through the outer cylinder 11 and damaging the interior thereof. However, the spacing between the dome 14 and both the outer cylinder 11 and the mounting flange 18 provides adequate outlet for the air exhausted by the fan 13.

It will be noted that the particular arrangement of the dome 14 with respect to the outer cylinder 11 renders the ventilator 10 weather proof regardless of whether the coach 16, upon which the ventilator 10 is mounted, is moving or standing still, and regardless of whether the ventilator is or is not, in operation.

Although the above mentioned drawing and description apply to one particular, preferred embodiment of the invention, it is not my intention, implied or otherwise, to eliminate other variations or modifications which do not depart from the scope of the invention unless specifically stated to the contrary in the hereinafter appended claim.

I claim:

In a ventilator mountable upon a substantially horizontal roof having an air space between the upper and lower surfaces thereof and a circular opening therethrough, the combination comprising: an outer cylinder substantially equal in diameter to said opening and having a mounting flange at the lower edge thereof securable to said upper surface around said opening; an inner cylinder slidably and snugly receivable within both said outer cylinder and said opening, said inner cylinder being mountable upon the wall of said opening and having a vent opening through the wall of said inner cylinder communicating with said air space; an axial flow fan and means for rotatably supporting same co-axially within said inner cylinder and on the upper edge thereof; a streamlined dome having a downwardly extending, peripheral flange surrounding said outer cylinder, the lower edge thereof defining a plane parallel with and spaced from said upper surface and intersecting said outer cylinder; brackets on said mounting flange spaced from said outer cylinder engaging said peripheral flange and supporting said dome; and a cylindrical baffle supported on and extending downwardly from said dome between said outer cylinder and said peripheral flange, said baffle being co-axial with said outer cylinder and extending below its upper edge.

FERN A. STRAWSINE.

References Cited in the file of this patent

UNITED STATES PATENTS

| Number | Name | Date |
|---|---|---|
| 1,722,825 | Roethel | July 30, 1929 |
| 2,157,609 | Hopkins | May 9, 1939 |
| 2,553,881 | Suttles | May 22, 1951 |